United States Patent [19]

Papafingos et al.

[11] 4,073,644

[45] Feb. 14, 1978

[54] SALT CAKE PROCESSING METHOD AND APPARATUS

[75] Inventors: Pandelis N. Papafingos; Richard T. Lance, both of Riverside, Calif.

[73] Assignee: Alumax Mill Products, Inc., Riverside, Calif.

[21] Appl. No.: 658,430

[22] Filed: Feb. 17, 1976

[51] Int. Cl.² ......................... C22B 21/00; C21B 3/04
[52] U.S. Cl. ...................................... 75/68 R; 75/24; 241/14; 241/20; 241/24
[58] Field of Search ................ 75/24, 25, 68; 241/14, 241/23, 24, 29, 64, 65, 43

[56] References Cited

U.S. PATENT DOCUMENTS

| | | | |
|---|---|---|---|
| 1,615,009 | 1/1927 | Frost | 75/68 R |
| 2,481,591 | 9/1949 | Heilman | 75/24 |
| 2,754,199 | 7/1956 | Stroup | 75/24 |
| 3,037,711 | 6/1962 | Businger | 241/24 |
| 3,043,678 | 7/1962 | Lowry | 75/24 |
| 3,417,930 | 12/1968 | Brumagin | 241/64 |
| 3,534,910 | 10/1970 | Brumagin | 241/23 |
| 3,657,997 | 4/1972 | Vellella | 241/14 |
| 3,675,859 | 7/1972 | Mitchell | 241/20 |
| 3,676,105 | 7/1972 | McLeod | 75/68 R |
| 3,770,424 | 11/1973 | Floyd | 75/68 R |
| 3,955,969 | 5/1976 | Johnson | 75/24 |

Primary Examiner—Peter D. Rosenberg
Attorney, Agent, or Firm—Knobbe, Martens, Olson, Hubbard & Bear

[57] ABSTRACT

A method of recovering aluminum metal values and salt cake and recycling or reusing the same in an aluminum refining method is disclosed.

11 Claims, 9 Drawing Figures

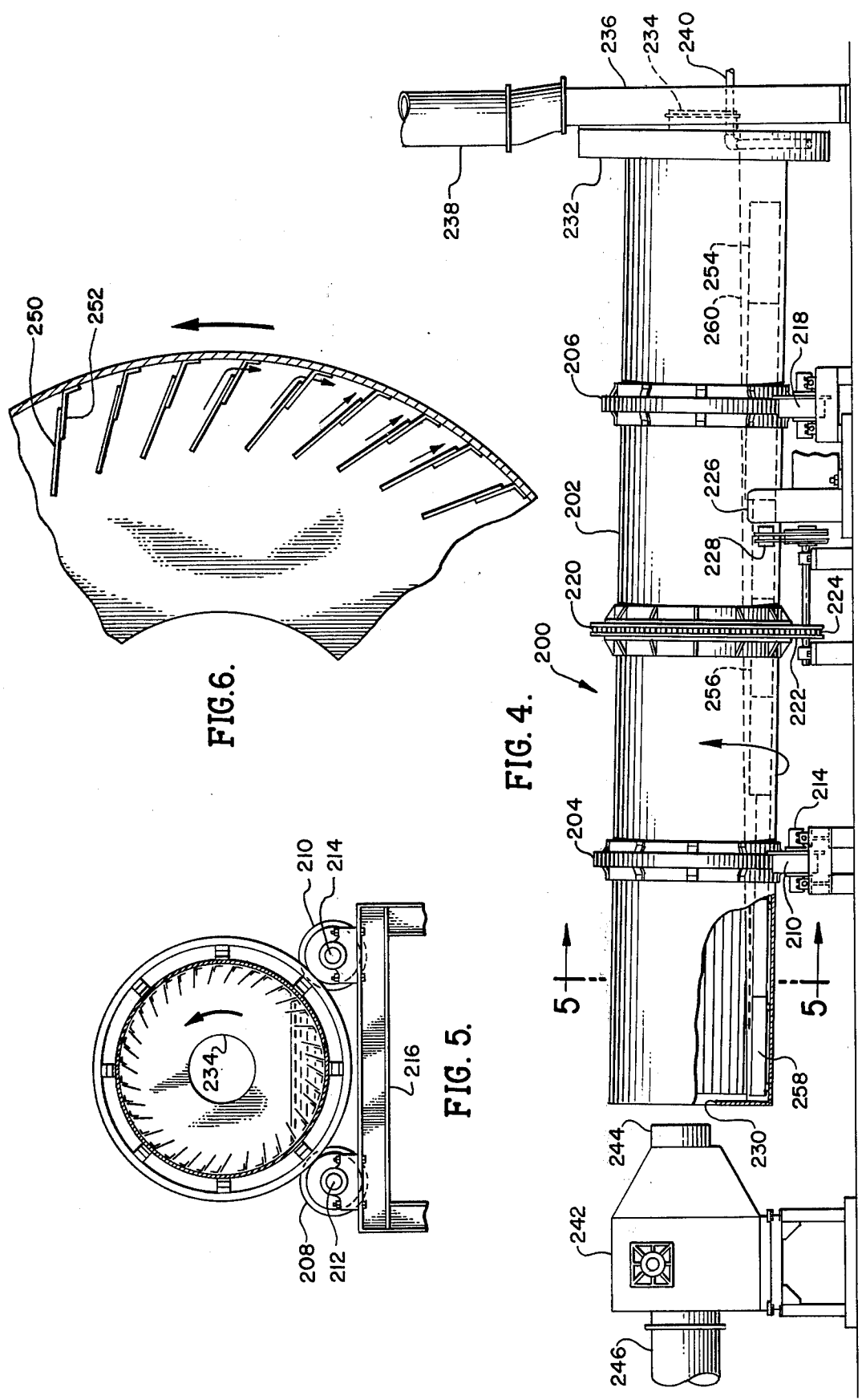

SALT CAKE PROCESSING METHOD AND APPARATUS

RELATED APPLICATION

SALT CAKE EVAPORATOR filed concurrently herewith by the same inventors, Ser. No. 658,150.

This invention relates to aluminum refining methods and, more particularly, to methods for treating dross, skimmed from aluminum metal surfaces, and salt cake resulting from the recovery of metal values in the dross.

This invention also relates to systems and apparatus particularly designed to carry out the aforesaid method and having unique advantages and features.

In a number of prior art processes for recovering aluminum metal value from aluminum dross, the dross is heated under a flux comprised of various salts or combinations of salts, usually comprising chloride salts of alkali or alkaline earth metals or mixtures of these salts. Fluoride salts are still used in some countries. In the fluxing step aluminum metal, protected by the flux, is removed from the dross by draining or other gravity or mechanical separating techniques leaving a product sometimes referred to as "salt cake" which is composed of the fluxing salt mixture, aluminum dross which is primarily oxides of aluminum, entrained aluminum metal particles or chunks, and, in general, all impurities which are less dense than aluminum or which are formed into particles with sufficient porosity to be less dense than aluminum. Traditionally, the salt cake is allowed to cool in large rocks or chunks resembling mine slag. These chunks are extremely hard, quite large, and, in general, are extremely difficult to handle.

These chunks or rocks of salt cake usually are broken up by heavy, specially designed, machinery, or by laborious manual or mechanical operations to recover the aluminum metal values which are entrained in the salt cake. The aluminum metal may appear as chunks ranging from the very fines to pieces several inches in thickness. Following removal of the valuable aluminum metal, the salt cake has, in the past, usually been discarded since it has no value in the form in which it exists and it has been too expensive and difficult to recover the flux salt components therefrom. Disposal of the salt cake presents particular problems and improper disposal often has resulted in serious ecological disruptions. Any disposal which presents the immediate or long terms potential of exposure to moisture presents the hazardous possibility that salts may be leached from the salt cake and carried into agricultural, industrial or potable water supplies. In the past, salt cake has been disposed of by simply depositing it in marble quarries, etc., in isolated locations. This type of disposal is unacceptable from the safety and ecological point of view since it presents the serious possibility that salts leached from the salt cake may find their way into underground or surface water streams or reservoirs.

One feature of this invention is that it provides method and apparatus for recovering not only aluminum metal values from salt cake but for recovering and recycling or otherwise using the fluxing salt components of salt cake.

Another feature of the invention is that it provides a system and method for recycling all reusable ingredients in the aluminum refining process.

An important feature of the invention is that there is provided a process and system which economically and efficiently recovers fluxing salts and thus avoids the ecological hazards which have been inherent in typical prior art practices.

In the refining of aluminum and the forming of metallic aluminum products, especially using secondary aluminum which may be heavily contaminated with impurities, aluminum is heated to a temperature above its melting point to form an aluminum melt which typically has a layer of dross on the exposed surface. The dross is comprised primarily of oxides of aluminum, but includes nitrides, carbides and a variety of other impurities. The present invention is an improvement in the recovery of metallic values from the dross and the recovery of fluxing salts in the recovery of these metallic values. The first step is to remove the dross from the melt and cool it so as to retain in the dross a substantial amount of the metallic aluminum which is entrained therein during the melting phase. The dross is then heated under a cover of flux salts, which typically comprise chloride salts of alkali or alkaline earth metals or mixtures of these. Once a temperature above the melting point of aluminum is reached, molten aluminum is removed from the dross leaving a flux-dross mixture which has entrained therein some residual aluminum metal. The flux-dross mixture is cooled to form a salt cake product which comprises pieces of salt cake having an average size of less than about one inch in thickness and less than about one hundred square inches in area, area being measured by the gross major dimensions, i.e., the length and width of the salt cake piece. The salt cake product is digested by heating and agitating it in water to thereby dissolve the salt therein to form a brine slurry of the salt in solution and the insoluble constitutents of the dross in suspension. This brine-dross slurry is separated into at least one cut which consists essentially of larger chunks of metal and dross which will not pass through a 24 to 60 mesh screen, i.e., having an average minor diameter of greater than about 700 microns, using a 24 mesh screen or about 250 microns using a 60 mesh screen, and into a final cut consisting essentially of a slurry of brine and particles having an average minor diameter of less than 700 microns. In one embodiment, an intermediate cut is taken which consists primarily of chunks less than about ¾ inch in diameter and greater than about 700 microns or 250 microns in diameter, depending on screen size, which contains substantial amounts of aluminum metal and a primary cut of larger than ¾ inch chunks is recycled. The intermediate cut is returned to the input of the dross-flux melting process step after being dried and treated to remove iron particles. The brine-dross slurry is then finally separated into a brine which is substantially free of particles and a cut consisting essentially of particles having an average minor diameter of less than 700 microns, or 250 microns, depending on screen size, a product often called dross fines. The dross fines are washed to reduce or eliminate salt content and are sold as a byproduct which is valuable in the steel industry. A portion of the brine is evaporated to cause crystallization of a portion of the salt dissolved therein to thereby form a salt crystal-brine slurry which is separated into its constituents. The salt crystals are removed and dried for recycle to the input of the fluxing stage or for other use. The brine constituent is returned to the evaporator for further concentration. By this means, substantially all aluminum metal values in the dross are recovered and used directly or recycled to the feed of the aluminum melt step and practically all of the flux salt is recovered and recycled for use in the flux-melting step or is used in other processes or sold for other uses.

These and other advantages and features of the invention will appear from the specification and drawings.

FIG. 4 depicts a unique evaporator system which has been found to be of surprising and exceptional value in the overall system, showing part of the interior of the evaporator by a broken away section.

FIG. 5 is a cross-section of the evaporator shown in FIG. 4, taken perpendicularly to the axis of the evaporator at section lines 5—5 of FIG. 4 in the direction of the arrows.

FIG. 6 is an enlarged view of a circumferential section of the evaporator showing in greater detail the structure and attachment of the evaporator fins to the interior wall of the evaporator drum.

Figure 1:
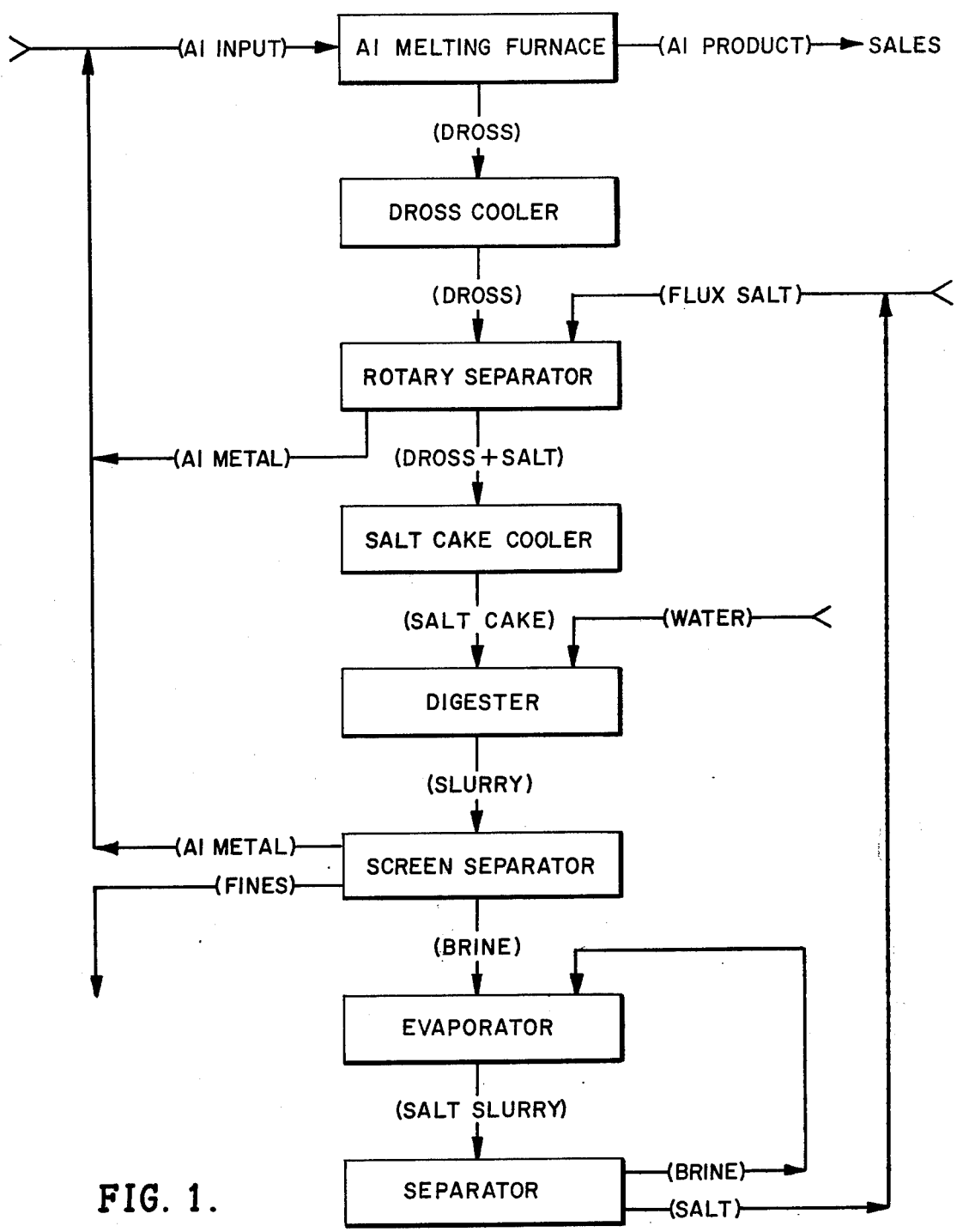
FIG. 1 is a flow diagram showing the process steps involved in the invention.

Referring first to FIG. 1, the process begins with the introduction of aluminum into the melting furnace. Secondary aluminum, which is a principal feed stock for this process, usually includes substantial amounts of impurities and a comparatively large quantity of dross is formed on the surface of the melt. After the aluminum has remained in the melt long enough for dross separation, it is tapped out as ingots and rolled into plates, sheets, ect., and sold as the ultimate product of the process.

During the melt operation, dross is scraped, usually manually using a long handled scraping hoe, out of the furnace. Any dross removal technique may, of course, be used. In the preferred embodiment, the dross is cooled quickly so as to retain in the dross most of the aluminum which has been entrained therein during the melt step. Apparatus and techniques for rapid cooling and the advantages thereof are described more fully in our copending application Ser. No. 625,286, filed Oct. 23, 1975, entitled "Aluminum Dross Recovery Method". Other dross cooling procedures may, of course, be used but with somewhat less efficiency. The dross is then introduced into a heating chamber along with a suitable amount of flux salt. In the preferred embodiment, a rotary separator which is provided with a source of heat to heat the dross to a temperature above the melting point of aluminum is utilized. The flux protects the aluminum from further oxidation during the melting and separating of the aluminum from the dross. The aluminum metal is tapped out and either used as is or is recycled to the aluminum input of the aluminum melting furnace. The mixture which is left, dross and flux salt, is cooled by tumbling and cooling the mixture onto cooling surfaces in a comparatively thin layer. Preferably, the salt cake product which is formed by cooling of the dross-flux salt mixture, is cooled and broken up during the cooling operation so as to form a product having a thickness of about ½ inch and a diameter of 2 to 3 inches. In nearly every instance, the average thickness will be less than about 1 inch and the average area, measured by the major dimensions on one of the larger sides of the piece, will be less than about 100 square inches.

This process of forming the salt cake in comparatively small, large surface area pieces is an important feature of the invention and departs from the usual prior art practices. In the prior art, the flux salt-dross mix was caused or allowed to cool in large, very hard chunks of salt cake which were hazardous to dispose of and extremely difficult to handle. In the prior art, salt cake was regarded as a by-product waste and, in spite of the hazards of disposal, was often simply disposed of in the least expensive and most convenient and expeditious manner. In some cases, industry scavengers would break the chunks of salt cake apart in the hopes of finding chunks of aluminum of sufficient size to be easily recovered. These chunks of aluminum were recovered and sold back to the aluminum industry. This scavenging operation was useful in the sense that aluminum which would have otherwise gone to waste was recovered and recycled into the aluminum metal industry. In the end, however, the salt cake was regarded as a waste product and was often disposed of in a hazardous manner as discussed before.

One of the important concepts of this invention is the recognition that by forming the salt cake in handlable, small large surface area chunks and recovering the flux salt values, a serious ecological and disposal problem was eliminated and, in addition, a usable and a valuable by-product was obtained.

The next step in the present process, is to digest the small, large surface area chunks of salt cake to separate the soluble flux salts from the insoluble dross material. Digestion is effected, in the preferred embodiment, in a rotary digesting drum by violent agitation and intermixing of the salt cake with hot water to form a concentrated salt brine slurry in which the insoluble dross particles are suspended.

The slurry is then separated into at least two cuts, and preferably into at least three. The first cut, in the preferred embodiment, is to separate large chunks of dross, i.e., larger than about ¾ inch in minor diameter from the remaining slurry. The minor diameter is the diameter of the chunk in the smallest dimension, the smallest dimension being the limiting factor insofar as the chunk passing through the openings in a screen. These larger chunks, which may vary from ¾ to 2 inches or 3 inches typically, are incompletely digested and retain substantial amounts of soluble flux salts retained therein. These chunks are returned to the grizzly, broken up further and recycled through the digestor. Some large chunks are essentially aluminum metal which is recycled.

In the preferred embodiment, an intermediate cut is taken. This cut, which is intermediate in the preferred embodiment, may be the first cut if the digestion process is effective on all of the salt cake chunks. This cut, which includes particles greater than about 700 microns or 250 microns depending on the screen mesh used in minor diameter up to about ¾ inch in diameter, and, greater if no earlier cut is taken, consists in large part of aluminum metal chunks which remain after the salt has been dissolved away and the dross has been broken away in the grizzly or during digestion. These metal chunks are returned to the feed of the aluminum melting furnace and recycled.

The final cut, which is usually accomplished in a separate filtering step, produces dross fines which are particles of aluminum metal and dross having a particle size of less than about 700 microns in minor diameter using a 24 mesh screen, 250 mirons using a 60 mesh screen or a diameter intermediate these values. This product contains substantial amounts of finely divided aluminum metal and is a valuable by-product which is used in the steel industry. If the aluminum metal remaining in the dross fines is insufficient to justify its use in the steel industry, the dross fines, having been washed free of salt, may be disposed of safely in earth fill disposal locations or may be used as a substitute for gravel or sand in forming concrete, asphalt or other paving materials.

The product remaining after filtering the dross fines is a brine which is substantially free of solids. In those few efforts in the prior art which have been made to recover flux salt, multiple effect evaporators and other complex and expensive evaporating systems have been used, nearly always unsuccessfully. In the present process, evaporation is accomplished efficiently and effectively to produce a high quality product economically in a unique evaporating apparatus and process. The evaporator and the process connected therewith will be described in greater detail in connection with the system for carrying out this invention.

The evaporator produced a slurry of salt crystals in highly concentrated brine. The brine-crystal slurry is pumped to a centrifugal, or other solid-liquid, separator where the crystalline salt product is separated from the brine. The salt is dried and sold for use in other industries or is recycled to the input of the separator as all or part of the fluxing salt. The brine is recycled to the evaporator.

The input to the overall process comprises aluminum, usually secondary aluminum, into the aluminum melting furnace, flux salt into the aluminum-dross separator and water into the digestor. The output of the overall process is aluminum metal, which is the primary product of the process, aluminum dross fines, which are sold as a by-product to the steel industry, fluxing salt and water. The salt recovered from the evaporator may also be considered as a by-product if it differs significantly from the flux salt composition. It will be seen from the flow diagram of FIG. 1 and from the foregoing discussin, that not only have the disposal inconveniences and hazards of the prior are been overcome, but valuable products are recovered and recycled or sold for use in other industries. While the immediate economies and benefits of the process of this invention are apparent and realizable, the long term ecological benefits are probably more important and have greater significance to the industry and to the public welfare generally.

The aluminum melting furnace may be of any of the types conventionally used throughout the aluminum industry. The dross removal from the surface of the molten aluminum may be according to any accepted practice in the industry. No criticality or importance whatsoever is attached to the type or design of melting furnaces or the method or apparatus for removing the aluminum dross.

The cooling and treatment of the dross following removal from the furnace is preferably, but not necessarily, carried out according to the teachings of our co-pending patent application, Ser. No. 625,286, filed Oct. 23, 1975, entitled "Aluminum Dross Recovery Method". Any method of recovering aluminum dross may, however, be used. The next step in the overall process is important if the maximum advantage and economy of the process is to be accomplished; however, the process can be carried out to great advantage even though the salt cake does not come out in the preferred form. Aluminum dross, which carries with it a very substantial amount of metallic aluminum, is heated under a cover of flux salt to above the melting point of aluminum metal. This heating may be carried out in any type of fluxing furnace, but the rotary type, which is standard in the industry, is a preferred apparatus.

In the prior art, it is conventional to simply dump the salt cake into a bin, car or other container and let it cool into large chunks. These chunks can be broken up and used in the processes described herein, but with considerably less economy and at much greater expense and difficulty than utilizing the overall procedure including the step of pouring the hot salt cake, which when molten is a viscous, slag-like material, onto a large surface rotating drum where it speads and cools evenly into a layer usually from $\frac{1}{8}$ to $\frac{1}{2}$ inch in thickness, the thickness sometimes extending up to approximately 1 inch. This large, thin layer cools and is broken up by the rotation of the drum and as it falls into a collection bin or car or onto a conveyer. This step provides a large surface area product which can be treated economically in the digester.

Figure 9:
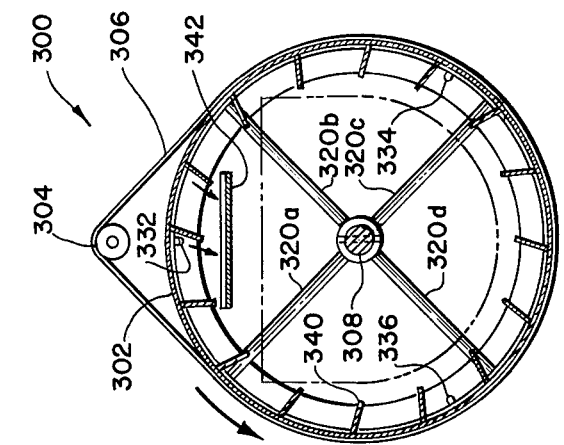
Figure 8:
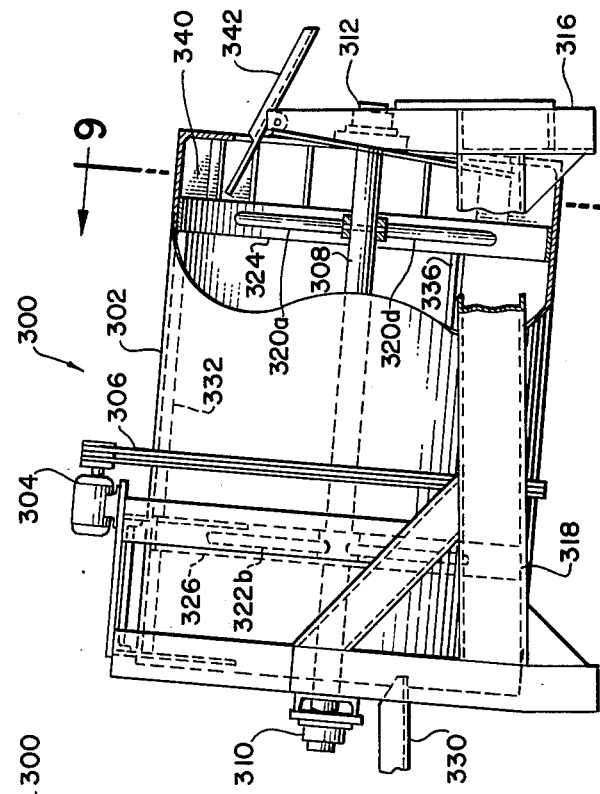
FIGS. 7 and 8 are, respectively, side and cross-sectional views of an apparatus for forming thin, flat chunks of salt cake.
Figure 7:
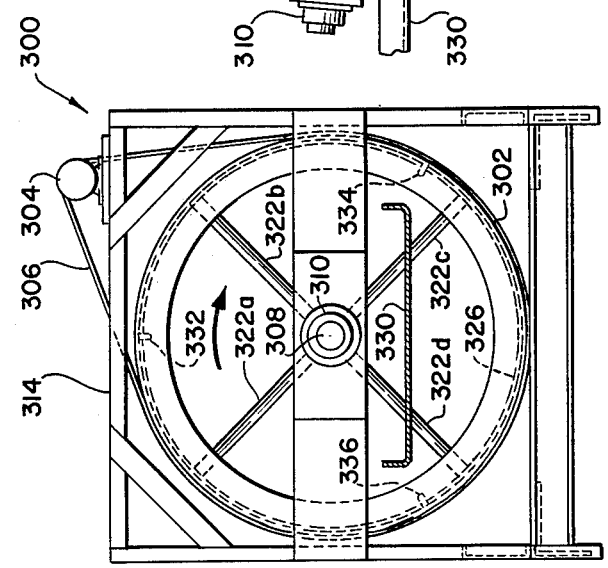

While other apparatus may be used to produce salt cake in thin relatively flat chunks, the apparatus shown in FIGS. 7, 8 and 9 has been found to be very efficient and advantageous in carrying out this process. The apparatus generally indicated at 300, includes a drum 302 which is driven by means of a motor 304 and a belt or chain system 306. The drum is mounted for rotation on a shaft 308 which is supported at each end by journal or other bearings 310 and 312 which are, respectively, supported in any suitable frame elements indicated generally at 314 and 316. At the respective ends, the two end frames being interconnected by any suitable longitudinal frame system indicated generally at 318. The drum 302 is concentrically supported about shaft 308 by means of radial support bars 320 at one end and 322 at the other end, the drum being reinforced at the support points by an internal support ring 324 at one end and 326 at the other end. The drum is mounted for rotation about an axis which is inclined from the inlet end to the outlet end downwardly with respect to horizontal.

At the inlet end, means for introducing molten, slag-like salt cake, such as inlet tray 330, is provided at the inlet end of the drum to spread the salt cake onto the interior surface of the drum, which is air cooled or, if desired, may be water cooled, spray cooled or otherwise cooled. As the salt cake slag rotates and moves downwardly, it is spread out over the surface of the drum and slowly hardens into a thin layer which becomes brittle and breaks as rotation continues. An extremely important feature of the invention is the inclusion of a small member, usually 3 or 4, ribs 332, 334 and 336. These ribs are, in the preferred embodiment, about 3 $\frac{1}{4}$ inches high, in the form of an inverted "V" rounded at the top to a radius of 1 inch, thus sloping upwardly and inwardly from the surface of the drum. This configuration prevents bridging when the ribs are properly spaced. The ribs run the length of the cooling surface, and may vary from 2 to 5 inches in height. It has been found that if the ribs are not provided, the slag-like salt cake does not spread evenly over the surface and is not adequately picked up for spreading by rotation. Conversely, if the ribs are placed too close together, i.e., at intervals less than about 90°, the salt cake bridges between the ribs and does not break loose.

After the salt cake has cooled and been formed into relatively thin pieces and broken up, the pieces are lifted by means of lifter blades 340, a plurality of which are arranged around the interior circumference adjacent the outlet end of the drum. The lifter blades pick up the pieces of hardened salt cake and drop them on the outlet chute 342 which guides them to a collection means, such as a car, box or the like.

In most respects the drum system 300 is like many other rotary drum reactors, but it is different in a most unexpected and unusual way in that it includes the small ribs spaced at intervals not closer than 90° about the interior circumference of the drum. This structure and its spacing is critical to the operation of this particular type of liquid to solid processing in this type of apparatus.

Figure 2:
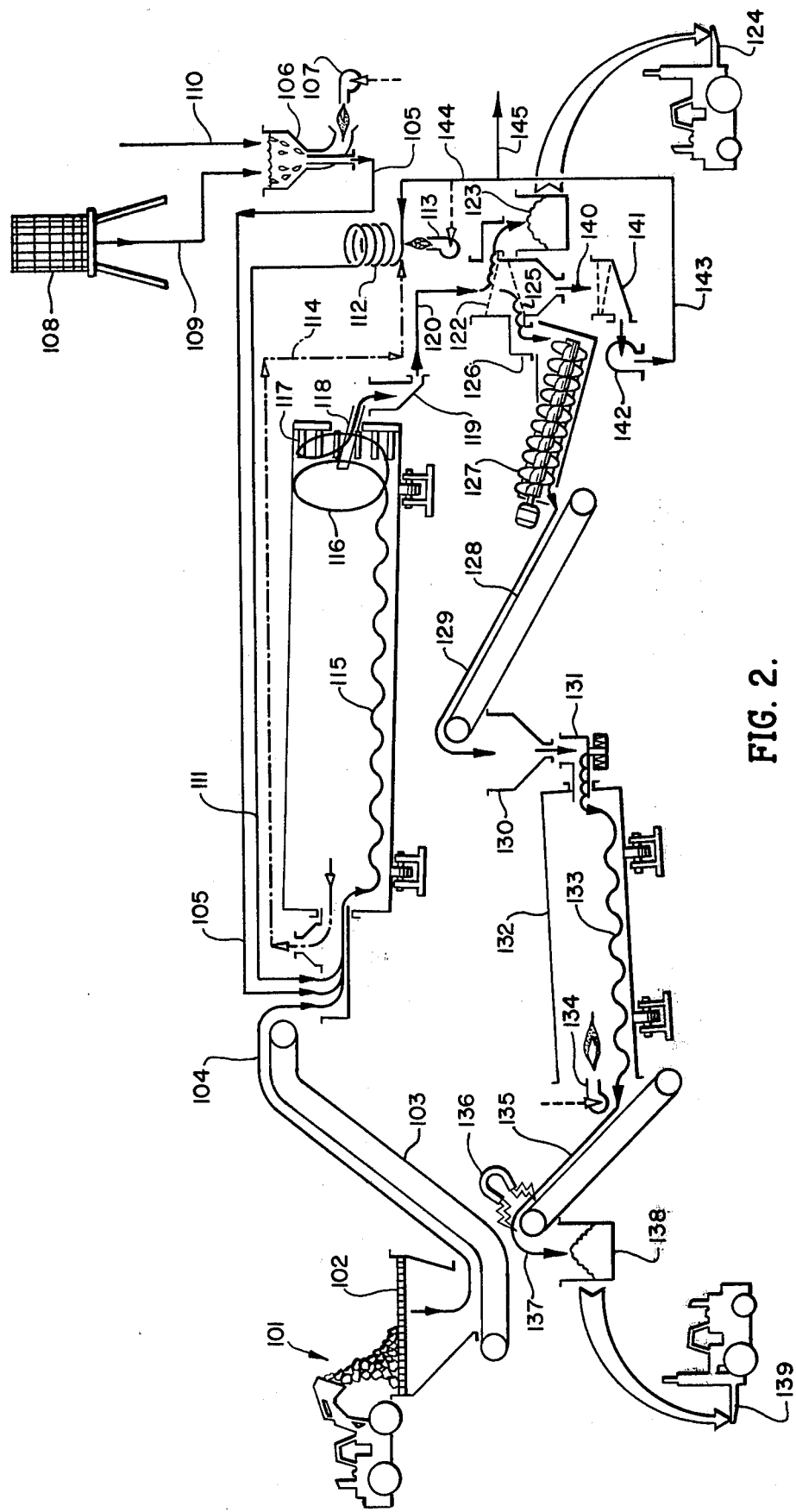
FIGS. 2 and 3 are a schematic flow chart of the process steps of the invention, showing the first half of the process in FIG. 2 and the last half of the process in FIG. 3.

The next step in the overall process is illustrated in FIG. 2, where, as shown at 101, the salt cake is dropped on a grizzly 102, and is then carried, by any conventional conveyor system 103, to the digester, as indicated by the flow line 104.

At the input to the digester, the salt cake, entering as indicated at line 104, is mixed with input water entering through line 105 from a digester feed tank 106, which is heated by any desired heating means, such as a gas blower furnace indicated schematically at 107. (In FIGS. 2 and 3, solid flow lines indicate liquid, solid or mixed flows whereas the broken ( ) line indicates process gas flow and the dashed (- - - ) line indicates heat gas flow.) The digester feed tank holds digester solution, which is principally water, derived from any fresh water source, such as commercial or industrial utility input indicated schematically in the diagram at 108 as a water tank, with the necessary make-up water being added through line 109. In addition, water recovered from washing dross fines is received from Line 163 on FIG. 3 through line 110 on FIG. 2.

Additionally, digester solution is intermixed with the salt cake through line 111 from a vertical heater 112, where heat is supplied by a gas fed blower furnace 113. In the preferred embodiment, exhaust fumes from the digester, which contain hydrogen, methane, and ammonia, are transferred through a fume recycle duct 114 to the input of the vertical heater 112 where the gaseous components are burned to water, carbon dioxide and nitrogen.

The input to the digester, then, is a mixture of large surface area chunks of salt cake and digester solution which consists essentially of hot water. In the preferred embodiment, the heat to the digester is provided entirely by external heating as in the vertical heater 112. However, the process could be carried out by direct heating of the digester contents or by providing heat in any other convenient manner.

The digester is a conventional rotary drum mounted at an incline so that the salt cake moves from the input end to the exist end, from left to right in FIG. 2, as indicated by line 115, and is lifted at the exit end, indicated by the line portion 116, using conventional lifters, as indicated at 117, and drop by discharge tray 118 into collector 119.

From the collector 119 the slurry of brine, resulting from dissolution of the sake cake into the water, and particles of dross and residual undissolved salt cake is transferred, as indicated at flow line 120, to a separator system in which at least two, and sometimes three, cuts are taken. In one form of the separator system, an initial cut is taken whereby large chunks, greater than about ¾ in diameter, as measured along the minor diameter of the chunk, are returned to the fluxing step. Sometimes this first cut also contains large chunks of aluminum which are returned to the melting furnace. If the salt cake input to the digester is in thin, large surface area chunks, the first separation cut may be omitted. In the embodiment illustrated, the first separation takes place at a screen indicated at 122 which has openings approximately ¾ inch in diameter. The chunks larger than ¾ inch in diameter, as measured by the minor diameter, i.e., all those chunks which will not pass through the screen 122, are collected in a bin 123 and periodically returned to the fluxing barrel using a standard forklift, indicated at 124, or by any other convenient conveyance method or means, or to the melting furnace as shown in FIG. 1.

The second cut is made at a screen indicated schematically at 125 which, in the preferred embodiment, is a 24 to 60 mesh (Tyler Series) screen with openings approximately 700 microns to 250 microns in diameter. Using a 24 mesh screen, for example, particles smaller than about 700 microns, in minor diameter, pass through the screen whereas those particles which are larger than about 700 microns in diameter, fall from the screen, as indicated by flow line 126, into a screw conveyor 127 and then to a lifting belt conveyor 128, both of conventional design, as is indicated by flow line 129, where the particles are stored in a collection bin 130 and eventually transferred by means of a vibrating feeder 131 to a dryer 132 where they pass through the dryer, as indicated by flow line 133. The dryer is heated by a gas fired furnace, shown schematically at 134. The dry particles are lifted by a conveyor 135 and pass under a magnet 136, as indicated by flow line 137, and then are deposited in a collection bin 138 and periodically transferred, for example by means of a lift truck 139, to the input of the salt fluxing step, or to the melting furnace.

It will be seen that, to this point in the process, all of the solid material is either dissolved and carried in solution to further steps of the process, to be described, or recycled into a preceding step so that there is no waste in the process.

Returning to the screen separator apparatus, a slurry remains after separation of the cuts of particles described hereinbefore. The slurry is transferred, as indicated by flow line 140, to a sump 141, where the slurry is pumped by means of a slurry pump 142 through flow line 143. Part of the slurry returns through flow line 144 back through the heater 112 and into the digester where it serves as part of the digestion solution. Part of the slurry is pumped through line 145 in FIG. 2 and line 146 in FIG. 3 to a filter slurry feed tank 147, which is heated by a gas fired blower furnace 148 to maintain the salt in solution, and is then fed by flow line 149 into a spreader trough 150 where it passes over a vacuum filter apparatus, shown at 151, wherein the particles are carried, as shown by flow line 152, along the surface of a conveyor 153 and washed by a flood system 154, which is fed through line 155 from any convenient source of water. This has the effect of washing the fines, i.e., those particles having passed through the 24 mesh to 60 mesh screen and having a particle diameter of less than about 250 microns to 700 microns, depending on the screen, free of salt. These particles which contain 50 to 60% moisture are transferred, shown by flow line 156, to a collection bin 157 where they are later transferred as by means of a forklift 158 to storage. Eventually, these fins are sold to the steel industry or elsewhere for the aluminum metal values which they contain or the fines, being free of soluble substances, may be used as solid fill without detriment to the ecology.

The brine is collected by catch trays shown at 159. Wash water, which typically contains 4 to 5% or up to 10% salt, by weight, is collected in tray 160 and recirculated through flow line 161 and pump 162 through line 163 in FIG. 3 to line 110 in FIG. 2 to the digester feed tank 106. As indicated by flow line 164, the brine is pumped from tray 159 by a pump 165 through line 166 to evaporator feed tank 167, wherein the brine is maintained at a temperature high enough to prevent premature crystallization of the salt by a gas fired blower furnace 168.

The evaporator is fed from the evaporator feed tank through line 169 to the evaporator 200, which will be described in greater detail hereinafter. As the brine flows through the evaporator, the solution reaches and is maintained at saturation with the continuous removal of moisture from the solution. This results in crystallization of the salt from the brine forming a salt crystal-brine slurry. The salt slurry is removed through flow line 170 and line 171 by salt-brine slurry pump 172 which pumps the slurry through flow line 173 to either of the saturated brine storage tanks 174 and 175 or to evaporator feed tank 167, or fed through flow line 176 to the salt crystal removal system. The stream may, of course, be divided, part being stored and part remaining in the process line. The saturated brine which stored is kept at approximately the same temperature by gas fired blower furnaces 179 and 180. Saturated brine slurry from storage may be fed from tank 174 through flow line 181 or from tank 175 through flow line 182 to flow line 169 to replace the source of brine slurry from the vacuum filter in the event the filter is down for maintenance or other reasons. The brine slurry is fed through flow line 176 from the evaporator to a cyclone 185. The salt slurry, which contains 70 to 90% water, and constitutes about 10% of the cyclone input, flows downwardly, as indicated by the flow line 186, and out the bottom of the cyclone to the centrifuge 187. Salt, which contains under 5%, typically 2 to 3% water, is discharged from the centrifuge, as shown by flow line 188, to a bin 190. At this level of water content the salt product is substantially dry. The flux salt product is periodically transported, by means of a forklift 191 for example back to the rotary barrel aluminum separator furnace where it serves as all or part of the fluxing salt. As shown by flow line 192, the brine is collected from the top cyclone and returned to the evaporator. Likewise, brine from the centrifuge is returned through pump 195 and line 196. Thus, all of the brine is recirculated continuously until salt recovery is complete. The brine may be returned to the evaporator at one point through a common conduit or at different points through multiple conduits, both of which approaches are included in the concept of the flow chart.

Figure 3:
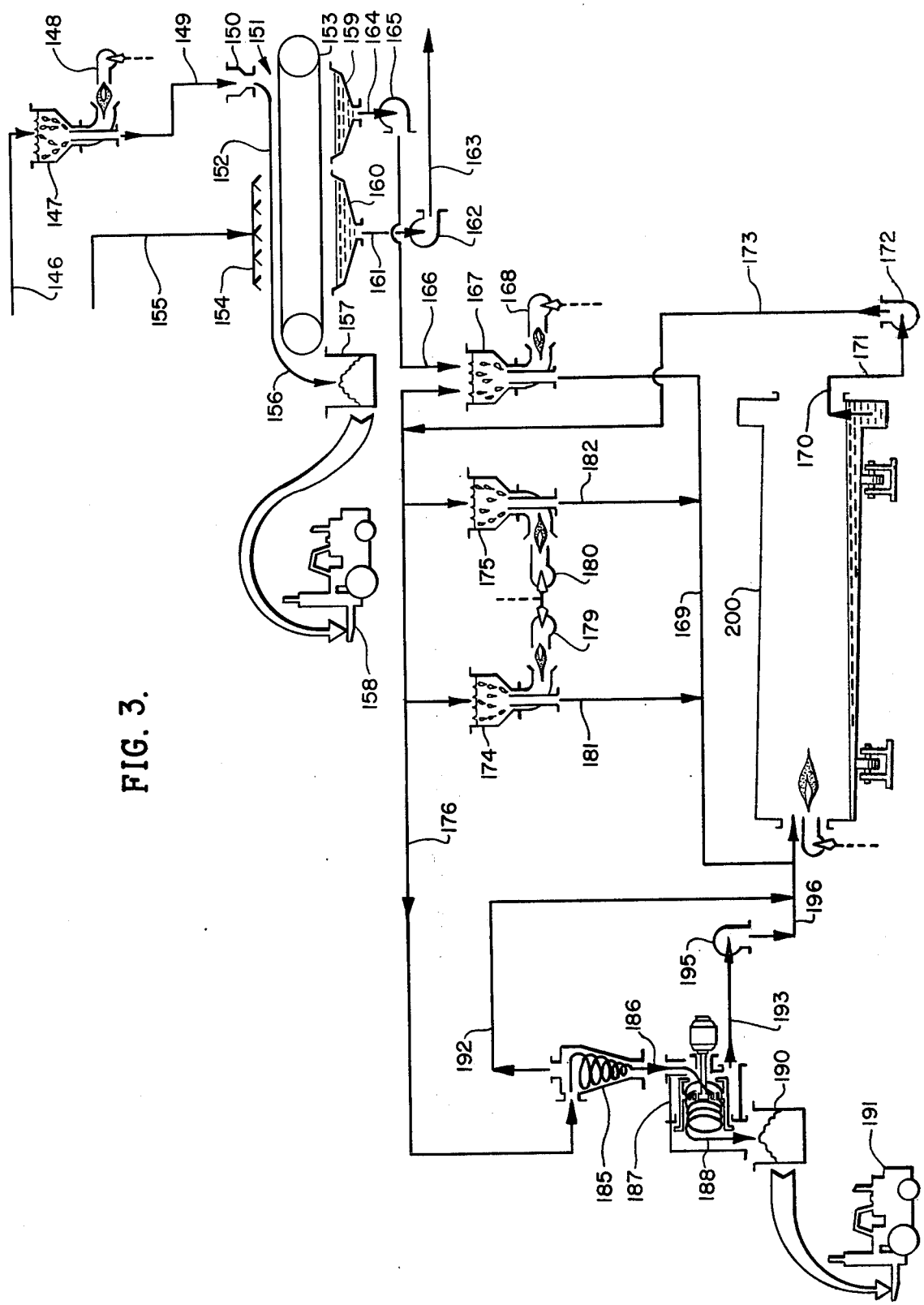

Returning momentarily to FIG. 1, and comparing this block diagram with the schematic flow diagram of FIGS. 2 and 3, it will be seen that there are two lines of input to the overall system, secondary aluminum and flux salt, and there are two outputs to the overall system, aluminum metal, which is the principal and, of course, the most valuable product, and aluminum oxide fines which are used in the steel industry or, if there is insufficient demand in the steel industry, can be used as fill without danger to the environment. Since the salt is recycled, the only salt input for fluxing is make-up for minimal amounts of salt which may be lost during processing. Essentially, the input to the overall system is secondary aluminum, the valuable product is metallic aluminum, the only by-product being the potentially valuable and always non-polluting aluminum-aluminum oxide fines product. All other materials, which in the prior art processes were by-products, some of them very serious and potentially hazardous pollutants, are recycled. During initial start-up, where a mixed salt flux is used, the salt recycled from the centrifuge, which contains less than about 5% water, typically 2 or 3% water, will be of a different composition than the flux, because of the difference in the solubilities of the salts. However, after the recovery process has reached equilibrium, the recycled salt flux will be substantially the same composition as the fluxing salt. At that point, the only make-up required is that necessary to compensate for spillage and for the extremely small, minute amounts which remain entrained in the fines.

One of the important facets of the invention resides in the design and operation of the evaporator. Reference is made to FIGS. 4, 5 and 6 as well as to FIGS 2 and 3 and to the following description for an understanding of the construction, operation and function of the evaporator system.

The evaporator, indicated generally at 200, comprises a cylindrical drum 202 which is supported for rotation by a pair of tires 204 and 206. The tire 204 rides on a pair of trunions 208 and 210 which are mounted on journaled axles 212 and 214 by brackets on a vertical support stand 216 in the manner conventionally used for supporting rotating processing drums. The tire 206 is likewise supported by a pair of trunions, one of which is shown at 218. The drum is supported at an angle, as illustrated in FIGS. 3 and 4, the extent and function of which will be discussed in detail hereinafter.

The drum is equipped with a sprocket 220 which is driven by a chain 222 and a smaller sprocket 224 which is, in turn, powered by a geared motor 226 and a pair of pulleys and belts indicated generally at 228. The motor 226 is a variable speed, reversible motor, or, equivalently, may be a constant speed motor equipped with a variable speed drive connector and reversing gears, to permit the drum to be rotated at the desired speed in either direction.

The drum is equipped at the input end, shown at the left in FIG. 4, with an opening 230. At the other end, the output end, a large diameter cylindrical well is mounted to the end of the drum to receive the brine-salt crystal slurry. In the center of the well 232 is an output opening 234. The output opening is surrounded by a cowling 236 which, in turn, is connected to a stack conduit 238 for dumping the gaseous products of the evaporation, principally water vapor, into the atmosphere, or conducting the gaseous ouput to a gas clean up system or to a vapor recovery system, as may be desired.

A slurry recovery line, 240, which corresponds to flow line 170 in FIG. 3, extends down into the well 232 and out through the opening 234 to permit removal by pumping of the brine-salt crystal slurry. The pipe 240 is L-shaped with the end which extends into the well being offset from the vertical slightly to compensate for the displacement of the fluid slurry in the well resulting from rotation of the drum. The amount of offset can be varied to obtain maximum depth in the salt in the well.

A gas fired blower furnace 242, provided with a nozzle 244, which can extend into the opening 230 in the input end of the evaporator drum and with an input conduit 246 provides a source of heat for evaporation and a source of air to carry out the evaporated moisture. In the preferred embodiment, the conduit 246 is connected to the stack of one or more aluminum melting furnaces or one or more aluminum recovery furnaces or to any other source of hot gas which would otherwise be unusable as a source of process heat. If the waste gas is available in sufficient quantities and at a high enough temperature, additional heating may not be required. It is, however, desirable to provide the furnace 242 to raise the temperature of any waste gases which may be available, if this is necessary, or to provide heat in the event the furnaces are shut down temporarily. In the conventional aluminum foundry, there are ample sources of hot gases available so that the energy put into the furnace can be maintained at a minimum.

The interior of the evaporator furnace is of a unique design, especially adapted to accomplish the evaporation, the evaporation step being described in greater detail hereinafter. Welded or otherwise secured to the interior wall of the drum, around the entire circumference, are a multiplicity of fins, indicated by way of example as fin 250 in FIG. 6. The fins are not, however, secured directly to the wall. Instead, two or more tabs 252 are secured to the fins at one end and are secured to the wall at the other end so as to space the proximal edge of the fin some distance away from the wall. The fins are arranged, in the preferred embodiment, in sets, each of which extends around the interior circumference of the drum, along the length of the drum, with wider fins being used at the output end of the drum, as indicated at 254 in FIG. 4, intermediate height fins being used in the central section of the drum, as indicated at 256 in FIG. 4, and narrower fins being used at the input end of the drum, as indicated at 258 in FIG. 4.

In an exemplary embodiment, the drum is approximately 38 to 40 feet long and has a diameter of about 7 feet. The wall thickness of the drum which is used by applicants is ⅜ inch. Of course the drum can be constructed in any convenient length or diameter. The evaporator is mounted at an incline of from about 1° to about 10°, preferably from about 2° to about 5°. The actual amount of incline is subject to considerable variation, depending upon the type of salt used and the desired rate of travel of the salt-brine slurry through the evaporator. It has been found, using the drum as described above, that an angle from about 2° to 5° is quite satisfactory to provide efficient flow through the evaporator and, at the same time, permit optimum evaporation. The brine, which forms the brine-salt crystal slurry upon partial evaporation, lies in the drum at a variable depth, the depth being greater at the output end than at the input end. The width of the fins is such that the fins are complete submerged in the brine when the fins are at the bottom of the drum during the rotational cycle of the drum, as the evaporator is in operation. Thus, the flow of salt and brine is from the input end, where the brine is introduced by simply extending a pipe into the evaporator or by any other desired means, to the output end where the remaining liquid and the crystallized salt is removed from the well and the vapor is removed from the central opening in the drum and is vented to the stack or to a recovery or clean up system as may be desired.

The fins are, in the exemplary embodiment, 3/16 inch thick steel plates 3 to 4 feet in length. Obviously, a multiplicity of short fins, thinner or thicker, or a fewer number of longer fins or fins of other materials may be used. Variable width fins would be an expedient equivalent. As the drum rotates, in the direction indicated by the arrows as indicated in FIGS. 4, 5 and 6, the brine initially covers the fins, when the fins are at the bottom, and flows over the fins and down between the fins and the drum wall, as indicated by the flow arrows in FIG. 6, as the fins move upwardly. This provision for the flow of the brine-salt crystal slurry continously wipes the inside surface of the cylinder and wipes each of the fins with the slurry. This has a very efficient cleaning action. Not only are the fins and the wall washed by the brine, but the fins and the wall are abraded by the salt in the brine-salt crystal slurry so that the surfaces of the fins and the wall are kept clean.

The fins are welded at an angle of from 0° to 85° measured with respect to the radius of the cylinder; i.e., the fins may be welded so that the plane of the fin lies on the radius, 0°, or 5° from perpendicular to the radius, 85°, or at any angle in between. In the preferred embodiment, the fins will be positioned so that the plane of the fin lies at an angle of from about 5° to about 45° from the radius which intersects the proximal edge of the fin.

No spacing between the fins is especially critical, but, in general, the more fins provided around the interior circumference of the drum, the more rapid and more efficient will be the evaporation. A convenient spacing between the fins may be from 2 inches to 10 inches.

The height of each fin, as measured along the radius of the drum which intersects the distal or outermost edge of the fin, and the incline of the drum are related. At a given incline, the brine level will be determined by the height from the edge of the drum to the opening in the output end of the evaporator drum. This brine level is indicated by a dashed line 260 in FIG. 4. Once that brine level has been determined, then the height of the fins, as measured along the radius extending through the distal edge of the fin, is fixed such that each fin is completely submerged in the brine as the respective fin rotates to the bottommost point in the rotational cycle of the evaporator drum. Of course, the more steeply the inclination of the drum, the greater will be the difference in the width of the fins between the input and the output ends of the evaporator drum.

As the evaporator rotates, the hot gases pass through the cylinder and carry away the vapors. At each rotation, the partially dried surface of the inside cylinder and the fins are submerged. As rotation continues, the salt precipitates out of the solution, is deposited on the fins and on the walls, and is washed away by the washing, inertial and abrating effect of the brine slurry as the fins and the wall pass first downwardly into the brine and then upwardly out of the brine.

A brine pump carries the brine from the well at the end of the evaporator. The brine-salt crystal slurry is, in the preferred method, passed through a cyclone and then through a centrifuge. Separation can be accomplished, however, in any number of ways, the most simple form being simply a settling basin. The concentrated brine is then reintroduced at the other end of the evaporator. New brine is constantly introduced into the evaporator as make-up so as to maintain the brine in the evaporator at a substantially constant level. The evaporator can also be run as a batch process.

The gases existing from the evaporator are principally combustion products, carbon dioxide and water, nitrogen from the air, and water vapor from evaporation of the brine solution. If waste gases are used as a source of heat, the gases may also include other constituents, depending upon the source of waste gas. The exit gases from the evaporator may be completely clean and non-contaminating, containing only carbon dioxide, nitrogen and water, in which case they may be simply vented into the atmosphere. Alternatively, the exit gases can be cooled and the water recovered. If the waste gases contain impurities, then it may be desirable to scrub the gas before venting it into the atmosphere, to recover the constituents or otherwise to treat the evaporator output gas. The method of handling and treatment of the evaporator output gas is not a critical or important facet of the present invention and will be dictated in large measure by the source of waste gas used as a heat gas for the evaporator.

The salt content of the brine will be dependent upon the solubility of the particular salt or mixture of salts in the water. In general, the solubility of the salt increases with temperature. Consequently, the amount of salt in the brine in the evaporator will be a function of the average temperature in the evaporator. For example, the evaporation step could be carried out at temperatures as low as 30° C or at temperatures as high as 100° C, or even higher. At the lower temperature, the solubility of most salts is only about ½ to ¾ the solubility of these salts at the higher temperature. There are, of course, advantages to operating the evaporator at the highest possible temperature, near the boiling point of the brine. The boiling point of the brine will, of course, vary depending on the amount and nature of the salt in solution. All of these factors, i.e., the solubility of salts, the boiling point of salt solutions, etc., are determinable from standard tables as may be found in any handbook of chemistry or chemical engineering. In particular instances, however, there may be very distinct economical and practical advantages in operating the evaporator at lower temperatures. For example, if a particular plant has available a source of waste hot gas which will result in an average temperature of 80° C. and any additional heat must be provided by burning utility gas or by electrical or other utility heating, then it may well be more economical to operate the evaporator at a lower temperature rather than to burn commercial gas or other fuel to get the increased temperature. In addition, depending upon the location of the evaporator, it may be desirable to optimize the temperature so as to not unduly raise the temperature in the surrounding area. In general, it may be said that the operating temperature is largely a matter of choice, but most efficient operation is accomplished by operating the evaporator at the highest possible temperature consistent with the economics of sources of heat.

As an average, using a conventional salt mixture, e.g., 50% sodium chloride and 50% potassium chloride the salt brine may contain 30% or more salt at saturation. The salt is removed and the brine recirculated. The removed salt generally contains from 70 to 80% moisture and is further dried to 3 to 5% moisture by centrifugation or by other conventional drying methods, or may simply be stored wet. Again, the amount of water removal, the methods of handling and storage are a matter of choice and depend upon particular uses contemplated for the salt, the rate of recycle, the nature of the salt, etc.

There are three main types of heat transfer used in evaporation. Conduction is a transfer from one part of a body, liquid or solid, to another part of the same body or from one body to another in physical contant. An externally heated boiler is, therefore, a conduction heat device. The externally heated boiler may also be, and generally is, a convection type of heating device in that the fluid is generally caused to flow from one point to another by reason of the different densities of the hot and cold fluid or by pumping, or by a combination of both natural and forced mixing. Radiation heating is the transfer of heat from one body to another by wave motion through space. Evaporation of water from the ocean in the natural cycle of water is the most simple example of this type of heating. In general, radiation heating is not efficient.

The heat required to evaporate one pound of water consists of, first, the heat necessary to bring the liquid to its boiling point, secondly, the heat of vaporization, thirdly, the heat of concentration of the solution, and fourth, the heat of crystallization of the products formed. In addition, the heat required to evaporate one pound of salt solution would, in practice, include compensation for radiation and other heat losses. In general, the heat to vaporize the water at its boiling point is the most important of the heat factors. Of course, as the solution becomes more concentrated, its boiling point rises and it therefor follows that more heat is required for evaporation.

Various boiler system are used in the industry to concentrate salts or to remove water from salts. Reverse osmosis is not practical at high concentrations of salt and therefore, has not found application in any relevant field. The processes most commonly used in analogous arts are singly effect evaporators or, in order to reduce the cost of steam, multiple effect evaporators. The capital costs of these installations is enormous, running into the millions of dollars. The use of stationary tube systems are also a potentially usable system. Stationary tubes, however, are subject to scale and often require either vacuum or high pressure steam, all of which add to the maintenance and operating costs. Also, as the concentration of solids increases during evaporation, a truly continuous separation is often difficult. On the one hand, because of the high degree of scaling and, on the other hand, because of the increase in the boiling point of the solution, as the solids increase. Continuous removal of salt during evaporation can cause the loss of vacuum in any system which depends upon reduced pressure.

In any such apparatus, which would be called a stationary system, an increase in scale formation has the increasing effect of loss of heat transfer. In addition, removal of scale requires that the operation be suspended. Often, such removal of scale requires the addition of reagents, such as hydrochloric acid, and have to be boiled in order to remove the scale. The down time and the cost of the reagents are both expensive items in the operating budgets of such systems.

The temperature of the inside wall of the tubes and the outside wall of the tube is an important consideration. The heat transfer will drop very rapidly as scale forms. An additional problem of great importance that occurs in the evaporation of solutions that do not have inverted solubilities, is referred to as the "salting" problem.

For example, in the evaporation of sodium chloride, there is the growth of crystals that develop around the heating surface. Once salting sets in, it usually is so progressive that operation must be interrupted and a boil out of the equipment is required.

There are many types of evaporators which have been and may be used for the recovery of salt from brine. These include Kettle Evaporators, which are usually jacketed, and often provided with vacuum seals for operation at reduced pressures. These evaporators are inadequate for several reasons. First, there is the serious problem of scaling. Secondly, and of extreme importance, is the tendency to foam formation in concentrated solutions of brine. Horizontal tube evaporators are even less adequate because they cannot be used with viscous liquids are certainly not where salt or scale is formed. The standard vertical tube evaporator is the most commonly used general purpose evaporator. Single and multiple effect evaporators are often used for salt reclamation and are comparatively efficient in their use of commercially available energy. However, these evaporators are not suited to use waste gas as a source of heat and, in a high cost-low availability energy society, the overall advantages of the multiple effect evaporator are certainly highly questionable.

The use of steam is a basic requirement in nearly all of the prior art evaporators which are suitable for use in recovering salt from brine solutions and vacuum is a basic requirement in many of the systems. Regardless of the number of "effects" used, basic problems exist in the prior art, some of which include:
1. High cost of capital investment.
2. Salting out which requires regular maintenance in order to chisel off the salt which adheres around the tubes or on the walls
3. Evaporation which requires boiling of the brine with attendant foaming, scaling and salting
4. Requirement of a source of vacuum in many cases.
5. A requirement of a source of steam in nearly all cases.
6. A requirement for the use of boiling out and cleaning reagents in nearly all systems.

In contrast, the rotary evaporator of this invention solves many of the problems which have plaqued the prior art. Among the features, functions and characteristics of the evaporator which provide these advantages:
1. The evaporation can occur without the necessity of the liquid reaching the boiling point. This may be an extremely important factor in certain types of brine solutions where foaming is a serious problem and in any brine solution where salting out tends to be a problem.
2. The evaporation of the liquid is obtained by the sequential dipping of hot, thin plates into a liquid, removing the plates from the liquid with a thin film of solution and subjecting the plates the flow of hot air. This causes the liquid to evaporate producing fine salt crystals. Since evaporation occurs in thin layers of liquid, there is no tendency to build up thick deposits of large salt crystals.
3. The rotation of the fins into and out of the liquid causes a disturbance of the liquid surface and constant mixing of the liquid, thus increasing the rate of evaporation because of a constantly changing and disturbed surface area in the brine which has the net effect of reducing surface tension and the prevention of the formation of a film of salt on the surface.
4. Additional evaporation is provided by the area increase, not only because of the surface provided by the plates or fins, but also because of the rotation of the drum where there is a continuous wet film formation on the inside surface of the drum.
5. Evaporation is increased by the "cooling tower effect" which is the cascading and dispersion of the liquid into the gas phase and the constant exposure of the air stream created here by the combination of the rotation of the cylinder and the fins and the inside portions of the rotating evaporator during the drying and wetting process with each rotation. The direction of rotation may be changed to modify the cooling tower effect and the angle of the mounting of the fins can be varied to maximize the cooling tower effect if this is desired. Moreover, faster rotation and a higher air velocity increase the cooling tower effect and the rate of evaporation.
6. There is no loss of heat due to poor heat transfer through a salt film or a scale. Direct heat is applied to the solution as the hot air contacts the thin layer of film on the fins and the drum. Thus, the most efficient contact of the heat with the solution to be evaporated is accomplished. Moreover, there is a continuous and predictable rate of heat transfer since there is no variation in the thickness of the scale and the salt film as would be the case in any stationary evaporator.
7. The rotary evaporator has a unique and extremely advantageous feature of being continuously self cleaning. The continuous removal of precipated salt as it is formed, and the avoidance of unnecessary heating of salts, coupled with sequential dipping of the plate into the brine, the disturbance of the liquid and the breaking of the surface tensions created by the rotation provides a self-cleaning action. The abrading effect of the crystallized salt in the brine slurry increases the efficiency and the net effect of the cleaning inherent in the rotary evaporator. Consequently, there is never the need to cease operation to break loose thick encrustations of salt, scale and the like.

Maximum efficiency and optimum operating characteristics have not been finally determined for the equipment used by the inventors. The following data were determined and are given as exemplary of minimal results which can be obtained using the evaporator of this invention. Neither the examples given nor the results, however, are either limiting or indicative of maximum operating efficiency.

EXAMPLE I

With an evaporator 40 feet long and 7 feet in diameter, with its entire inside length having no other added surface than the cylindrical surface, the evaporator was supplied with 15,000 cubic feet of air per minute at an ambient temperature, approximately 30° C. No heat was used. The rate of evaporation was 40 gallons per hour, using a charge of 2,000 gallons of cold water and a rotating speed of 2 revolutions per minute. This involved the minimum in surface since there was no additional surface supplied in the rotating cylinder. Similarly, there was no heat added and, indeed, the water had a cooling effect, since the temperature of the water was approximately 10° C at the time of introduction.

EXAMPLE II 24 aluminum tubes 30 feet in length with a diameter of 10 inches were introduced inside the rotating cylinder so that additional surface was provided. By rotating the cylinder and providing heat through an oil burner at an undetermined value, the rate of evaporation was increased to 1,000 gallons per hour.

EXAMPLE III

Metal fins are welded longitudinally along the inside length of the evaporator. These fins are approximately 3 feet in length. At the weld portion, regular gaps are provided to allow the brine and salt slurry to slide against the surface of the cylinder as it rotated. The fins are welded at an angle of 30% with respect to the radius passing through the proximal edge of the fins and located at intervals of 10° around the circumference of the drum. Each fin is cut so that as the evaporator turned, the fin is submerged in the brine with each revolution of the evaporator. Since the evaporator axis is set on an incline angle, the height of the fins increased towards the discharge end. When the rotating evaporator was filled with brine and put into operation, various runs will yield evaporation rates of from 700 to 1,000 gallons per hour. Considerable experimental data will be required before the optimum efficiency in terms of rotational speed, input temperature, etc., can be determined.

EXAMPLE IV

Salt cake from the aluminum recovery steps was run on an experimental basis in equipment of the type described all the way through the evaporation — salt recovery cycle. Approximately 10% of the salt cake was recovered as metallic aluminum, 28% was recovered as −24 mesh fines, and 58% was recovered as flux salt. The "loss", about 4%, was salt intermixed with aluminum metal and returned to the furnace. No such loss would normally occur in continuous industrial scale operation.

It will be apparent from the foregoing discussions, drawings, and examples, all of which are merely exemplary and are not limiting, that there is no need for vacuum or other complex operations, no need for steam plants with the consequent high capital investment, no foam creation, the evaporator operates with viscous liquids and saturated brines and is installed with a minimum of capital investment. There is not formation of scale, solidified or glazed salt on the surface inside the rotating evaporator. There is no downtime to remove adhered salts or scale and no need for acid boilouts. There is no salting phenomena and the salt produced by evaporation is continuously removed. Consequently there is no excessive buildup of brine concentration or of salts in the suspension. There is no hydrostatic head on any portion of the liquid, consequently, the liquid evaporates at lower temperatures than would be required in a system which had a high hydrostatic head. The evaporator provides a large surface, not only by the addition of fins but by the large surface area of the drum as it rotates. This large surface area provides a continuous wet film which results in highly efficient evaporation and the production of fine, easily handlable salt crystals. There is no stress on the equipment, since the equipment operates at low pressures and always maintains the same temperature profile. One of the most important advantages of the invention in the aluminum industry is the ability efficiently to use heat and gases which were heretofore wasted. Stack gases from melting furnaces and the like, for example, are very efficiently used to carry out the evaporating process of this invention. Except for the evaporator system and the salt cooler, all components of the recovery system are commercially available items purchased from the manufacturers. Thus, the entire recovery system can be constructed using readily available industrial equipment with only the need especially to build the evaporator. While precise optimum operating characteristics and process variables have not been finally determined, it is apparent from the experience already obtained on an experimental basis that the evaporator provides great efficiencies and great economies as compared with any other available brine evaporator system. The process as a whole eliminates serious ecological and environmental problems and efficiently recycles dangerous salt contaminates which were heretofore a hazardous waste by-product and provides a source of a valuable by-product consisting essentially of oxides of aluminum metal in the form of fines, i.e., very fine particles having a size under about 700 microns. All aluminum values, except the values contained in the fines, are recycled and ultimately end up in the aluminum product. Waste is minimized, efficiency is maximized and ecological, environmental and pollution problems are solved.

We claim these and all other advantages flowing from the unique design and combination of steps and features disclosed herein as set forth in the following claims.

What is claimed is:

1. The improved method of recovering metallic values from dross and recovering fluxing salts used in the recovery of such metallic values comprising the steps of:

Step 1: removing dross from the melt and cooling the dross to retain in the dross metallic aluminum entrained therein;

Step 2: heating the dross under a cover of flux salts comprised of chloride salts of metals selected from the group consisting of alkali, alkaline earth metals and mixtures of the same to a temperature above the melting point of aluminum;

Step 3: removing molten aluminum from the dross leaving a flux-dross mixture having entrained therein residual aluminum metal;

Step 4: cooling the flux-dross mixture to form a salt cake product comprising pieces of salt cake having an average size of less than about 1 inch in thickness and about 100 square inches in area;

Step 5: digesting said salt cake product by heating and agitating the same in water to thereby dissolve the salt therein to form a brine slurry of the salt in solution and the insoluble constituents of the dross;

Step 6: separating the brine slurry into at least one cut consisting substantially of larger chucks of metal and dross having an average minor diameter of greater than about 250 microns and a final cut consisting essentially of a slurry of brine and particles having an average minor diameter of less than about 700 microns;

Step 7: separating from the slurry of Step 6 substantially all particles of dross and washing the same to produce a by-product consisting essentially of particles of aluminum oxide and aluminum metal having an average particle size of less than about 700 microns;

Step 8: evaporating a portion of the brine remaining after the separation of Step 7 to thereby cause crystallization of a portion of the salt dissolved therein and form a salt crystal-brine slurry and Step 9: separating crystallized salt from the crystal-brine slurry of Step 8 to produce a flux salt product suitable for recycling as part of the flux salts of Step 2 and returning the brine remaining from the separation for further evaporation in Step 8.

2. In the improved method of claim 1, the further improvement in Step 6 of separating the brine slurry into a first cut comprising chunks having an average minor diameter of not greater than about three-fourths inch and greater than about 250 microns, said chunks consisting in major portion of metallic aluminum, and returning said chunks to the input of the method to be recycled as part of the aluminum melt.

3. In a process for treating aluminum dross wherein metal containing dross is heated under flux salt to melt and remove the metallic constituents, the improvement comprising the steps of:

First, digesting the residual mixture of flux salt and dross by heating and agitating the same in water to dissolve the flux salt thus forming a slurry of dross particles in brine;

Second, separating the dross particles from the brine; and

Third, concentrating the brine and causing precipitation of flux salt crystals by repeatedly contacting thin layers of the brine on an evaporator surface with hot, flowing gas to cause formation of salt crystals on said surface and repeatedly immersing said surface into the brine to thereby wash said surface free of crystals and re-form a layer of brine thereon.

4. The process of claim 3 including the additional step of separating the dross particles into at least two cuts, including one cut of fines having an average particle diameter of less than about 700 microns and the step of washing said fines free of salt to thereby produce a fines product suitable for sale or disposal as solid, non-contaminating waste.

5. The process of claim 3 including the step of spreading and cooling the residual mixture of dross and flux salt to form chunks having a surface area of less than about 100 square inches and a thickness of less than about one inch.

6. The process of claim 3 wherein the step of concentrating the brine includes the following steps in repeated succession:

introducing brine at an input end of a rotating evaporator cylinder having fins extending inwardly from the interior walls thereof to form a large evaporating surface;

forming thin layers of brine on said evaporating surface as the cylinder rotates;

passing hot evaporating gas through the cylinder to evaporate the thin layers of brine and form salt crystals on the evaporating surface; and removing the salt crystals from the evaporating surface by dipping the surface into, through and out of a body of brine in the lower portion of the cylinder.

7. The process of claim 6 including the steps of:

removing brine-flux salt slurry from an output end of the evaporator;

separating the flux salt crystals from the brine; and recycling the brine to the input of the evaporator.

8. The process of claim 6 wherein the step of passing hot evaporating gas through the cylinder includes conducting hot waste industrial gas from a source such as a furnace in the same plant to the input of the cylindrical evaporator to thereby utilize the waste furnace gas heat as evaporating heat in the evaporating furnace.

9. The process of claim 3 wherein hot waste gas from a source in the same plant is flowed through the evaporator to cause formation of salt crystals on the evaporator surface.

10. The process of claim 3 including the additional step of casting molten, slag-like flux salt-dross mixture onto a rotating surface and, by such rotation, causing the salt dross mixture to spread into thin layers and to break into pieces to form a salt-dross product composed of generally flat pieces less than about 1 inch in thickness and less than about 100 square inches in surface area measured on the largest generally flat surface, to thereby prepare the salt-dross mixture for digestion.

11. The process of preparing salt cake for digestion comprising casting molten, slat-like flux salt-dross mixture onto a rotating surface and, by such rotation, causing the salt-dross mixture to spread into thin layers and to break into pieces to form a salt-dross product composed of generally flat pieces less than about 1 inch in thickness and less than about 100 square inches in surface area measured on the largest generally flat surface thereof.

* * * * *